United States Patent
Aoki et al.

(10) Patent No.: US 11,949,557 B2
(45) Date of Patent: *Apr. 2, 2024

(54) DEVICE, METHOD, AND PROGRAM FOR ICT RESOURCE MANAGEMENT USING SERVICE MANAGEMENT INFORMATION

(71) Applicant: Nippon Telegraph and Telephone Corporation, Tokyo (JP)

(72) Inventors: Daisuke Aoki, Tokyo (JP); Takeshi Kuwagata, Tokyo (JP); Katsuyuki Hasebe, Tokyo (JP); Makoto Kanzaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 17/311,007

(22) PCT Filed: Nov. 25, 2019

(86) PCT No.: PCT/JP2019/045933
§ 371 (c)(1),
(2) Date: Jun. 4, 2021

(87) PCT Pub. No.: WO2020/116222
PCT Pub. Date: Jun. 11, 2020

(65) Prior Publication Data
US 2022/0021580 A1    Jan. 20, 2022

(30) Foreign Application Priority Data

Dec. 4, 2018   (JP) ................................. 2018-227539

(51) Int. Cl.
*G06F 15/177*   (2006.01)
*H04L 41/0816*  (2022.01)
(Continued)

(52) U.S. Cl.
CPC ...... *H04L 41/0816* (2013.01); *H04L 41/0853* (2013.01); *H04L 67/52* (2022.05)

(58) Field of Classification Search
CPC ... H04L 41/0816; H04L 41/082; H04L 67/52; H04L 41/0853; G06F 30/18; G06F 9/5077
(Continued)

(56) References Cited

U.S. PATENT DOCUMENTS 7,519,769 B1 *  4/2009  Kulkarni ............. H04L 67/1097
                                                    711/114
9,118,538 B1 *  8/2015  Lekkalapudi ........... H04L 43/00
(Continued)

FOREIGN PATENT DOCUMENTS

JP    2015-056182    3/2015
JP    2018-032897    3/2018

*Primary Examiner* — Kaylee J Huang
(74) *Attorney, Agent, or Firm* — Fish & Richardson P.C.

(57) ABSTRACT

The ICT resource management device includes: a configuration information management part that manages configuration information of physical nodes and virtual nodes; a layer mapping part that performs mapping between the physical layer and the virtual layer; a location specifying part that specifies a location of a physical node; a device connect destination determination part that determines a physical node to which to connect the device in response to a request for configuration change based on at least one of the specified location, information relating to a service, a network connection configuration of the network connecting the device to the physical node, and quality of the network; a blueprint creation part that creates a blueprint based on the configuration information, the mapping information, and the connection destination; and an orchestrator part that performs orchestration.

9 Claims, 7 Drawing Sheets

(51) Int. Cl.
*H04L 41/0853* (2022.01)
*H04L 67/52* (2022.01)

(58) Field of Classification Search
USPC .................... 709/220, 221, 223, 224, 226
See application file for complete search history.

(56) References Cited

U.S. PATENT DOCUMENTS

| | | | |
|---|---|---|---|
| 9,229,850 B1* | 1/2016 | Wang | G06F 3/0665 |
| 2009/0132543 A1* | 5/2009 | Chatley | H04L 67/1001 |
| 2013/0232498 A1 | 9/2013 | Mangtani et al. | |
| 2015/0082308 A1 | 3/2015 | Kiess et al. | |
| 2018/0157384 A1* | 6/2018 | Baneva | G06F 9/5077 |
| 2018/0322556 A1 | 11/2018 | Padmanabh et al. | |

* cited by examiner

| | Node ID | State | Host name | IP address | VM ID | Service used | User | Location | Network Connection | Quality |
|---|---|---|---|---|---|---|---|---|---|---|
| Physical | PH1 | OK | host A | XXX | VI-1,VI-2 | ser1 | user1 | yyy | XXX | XXX |
| | PH2 | OK | host B | XXX | VI-3 | ser2 | user2 | zzz | XXX | XXX |
| | ... | ... | ... | ... | ... | ... | ... | ... | ... | ... |

| | Node ID | State | VM name | IP address | Physical device ID |
|---|---|---|---|---|---|
| Virtual | VI-1 | OK | VM1 | XXX | PH1 |
| | VI-2 | OK | VM2 | XXX | PH1 |
| | VI-3 | OK | VM3 | XXX | PH2 |
| | ... | ... | ... | ... | ... |

Blueprint

Service termplate
- Catalog (for VM creation)
- Catalog (for NW configuration)
- Catalog (for container configuration)

Parameter
- 5VMs Web: 3VMs AP: 2VMs
- allocated IP address
- Copy execution by Rancher

| Service ID | Used application | Operational ICT resource | SLA |
|---|---|---|---|
| XXX | XXX | XXX | XXX |
| ... | ... | ... | ... |

DEVICE, METHOD, AND PROGRAM FOR ICT RESOURCE MANAGEMENT USING SERVICE MANAGEMENT INFORMATION

CROSS-REFERENCE TO RELATED APPLICATIONS

This application is a National Stage Application of International Application No. PCT/JP2019/045933 filed on Nov. 25, 2019 on the basis of Japan Application Serial Number 2018-227539 filed on Dec. 4, 2018, the contents of which applications are incorporated by reference herein in its entirety. To the extent appropriate, priority of this application is claimed to the above disclosed applications.

TECHNICAL FIELD

The present invention relates to an ICT (Information and Communication Technology) resource management device, an ICT resource management method, and an ICT resource management program.

BACKGROUND ART

Techniques to provide a service from a service provider to an end user have been increasingly developed these years. For example, Patent Literature 1 discloses that "An inter-business operator package service construction device provides, in response to an order request for communication service use from a terminal of a service provider, a package of one or more communication services different from each other publicized by communication service APIs by wholesale service providers. The device includes a package construction function unit that: retains a catalog describing specifications of communication wholesale services and coordination rules defining coordination among various communication services; constructs a coordination service coordinating as a package communication service API corresponding to a plurality of communication services requested by an order on the basis of the retained catalog and coordination rules at the time of order request for use of the plurality of communication services from the terminal; and provides the coordination service for the terminal."

CITATION LIST

Patent Literature

Patent Literature 1: Japanese Laid-Open Patent Application, Publication No. 2018-32897 (Claim 1)

A system to provide a service includes, for example, a distributed system to which virtualization technology is applied. The distributed system to which virtualization technology is applied includes physical nodes such as servers and edges, and one or more virtual nodes run in each physical node. For example, an operation such as arranging a new application on a virtual node is performed so that a service is available on a device (e.g., an IoT (Internet of Things) device) connected to a physical node. However, conventional application arranging control techniques such as a container do not consider a location of the physical node, a network connection configuration of a network connecting the device to the physical node, quality of the network, and the like. Therefore, depending on the location of the application, there may be a problem of service quality degradation such as a failure of satisfying an SLA (Service Level Agreement; e.g., delay condition) of the service already provided by the distributed system.

In view of the background described above, it is an object of the present invention to solve a problem of preventing the service quality degradation considering at least any one item among the location of the physical node, the SLA, the network connection configuration of the network connecting the device and the physical node, and the quality of the network in the distributed system.

Solution to Problem

In order to solve the problems described above, a first aspect of the present invention provides an ICT resource management device that manages a physical node and a virtual node as ICT resources, includes: a configuration information management part configured to manage physical layer configuration information that is information on a configuration of the physical node on a physical layer and virtual layer configuration information that is information on a configuration of the virtual node on a virtual layer; a layer mapping part configured to perform mapping between the physical layer and the virtual layer; a location specifying part that specifies a location of the physical node included in the physical layer configuration information; a device connect destination determination part that determines a physical node that is to be a connection destination to which a device utilizing a service is to be connected, in response to a request for configuration change regarding the connection of the device utilizing the service to the physical node, based on at least any one of the specified location, information on the service, a network connection configuration of the network connecting the device to the physical node, and quality of the network; a blueprint creation part configured to create a blueprint in response to the request for configuration change, which blueprint is design information on an infrastructure required for the configuration change and is based on the physical layer configuration information, the virtual layer configuration information, mapping information that is information obtained as a result of the mapping, and the connection destination; and an orchestrator part configured to perform orchestration of the virtual layer based on the blueprint by accessing and running a program that is operable via an API.

According to a third aspect of the invention, an ICT resource management method in an ICT resource management device that manages a physical node and a virtual node as ICT resources, includes steps of: managing physical layer configuration information that is information on a configuration of the physical node on a physical layer and virtual layer configuration information that is information on a configuration of the virtual node on a virtual layer; performing mapping between the physical layer and the virtual layer; specifying a location of the physical node included in the physical layer configuration information; determining a physical node that is to be a connection destination to which a device utilizing a service is to be connected, in response to a request for configuration change regarding the connection of the device utilizing the service to the physical node, based on at least any one of the specified location, information on the service, a network connection configuration of the network connecting the device to the physical node, and quality of the network; creating a blueprint in response to the request for configuration change, which blueprint is design information on an infrastructure required for the configuration change and is based on the physical layer configuration information, the virtual layer configuration information, mapping information that is information obtained as a result of the mapping, and the destination information; and performing orchestration of the virtual layer based on the blueprint by accessing and running a program that is operable via an API.

According to a first and third aspects of the invention, an optimum connection destination of the device can be determined to satisfy the service SLA.

Therefore, the degradation of the quality of service for the operation can be prevented by taking into consideration at least any one item among the location of the physical node in the distributed system, the SLA, the network connection configuration of the network connecting the device to the physical node, and the quality of the network in the distributed system.

Further, a second aspect of the invention is the ICT resource management device according to the first aspect of the invention wherein the connection destination includes a movable physical node.

According to the second aspect of the invention, load distribution in the distributed system can be easily achieved by including the movable physical node into the connection destination of the device and moving the movable physical node to a vicinity of a device that may cause a load increase of a specific physical node and connecting the movable physical node to the device.

The invention according to a fourth aspect of the invention discloses an ICT resource management program that is configured to cause a computer to function as the ICT resource management device according to the first and second aspects of the invention.

According to the fourth aspect of the invention, construction of the ICT resource management device can be facilitated.

Advantageous Effects of Invention

According to the present invention, the degradation of the service quality for the operation is able to be prevented by taking into consideration at least any one of the location of the physical node, the SLA, the network connection configuration of the network connecting the device to the physical node, and the quality of the network in the distributed system.

BRIEF DESCRIPTION OF DRAWINGS

FIG. 3 is a data structure diagram illustrating an example of physical layer configuration information according to the embodiment.

FIG. 4 is a data structure diagram illustrating an example of virtual layer configuration information according to the embodiment.

FIG. 5 is a diagram for explaining an example of a blueprint according to the embodiment.

FIG. 6 is a data structure diagram illustrating an example of service management information.

DESCRIPTION OF EMBODIMENT

Hereinbelow, description is given of embodiments for carrying out the present invention (hereinbelow, referred to as "this embodiment") with reference to the drawings.
<<Configuration>>

Figure 1:
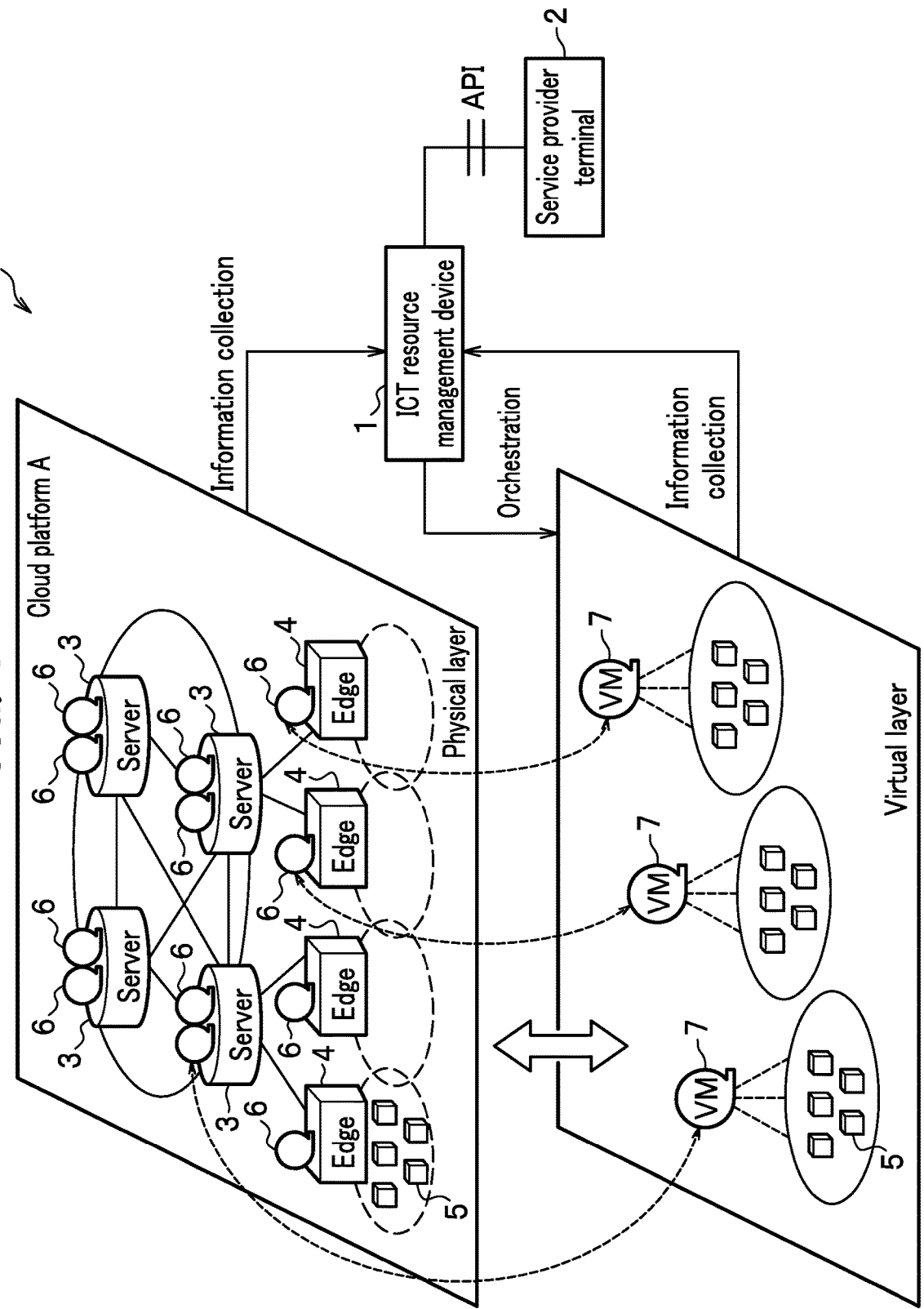
FIG. 1 is a functional configuration diagram illustrating an example of a distributed system including an ICT resource management device according to an embodiment of the present invention.

As illustrated in FIG. 1, a distributed system 100 including an ICT resource management device 1 according to this embodiment: is a system to which virtualization technology is applied; and includes the ICT resource management device 1, a service provider terminal 2, a server 3, an edge 4, and a device 5. The distributed system 100 is configured to manage: a physical layer which is a collection of physical nodes; and a virtual layer which is a collection of virtual nodes, each of which is configured and operates on a physical node. Each of the server 3, the edge 4, and the device 5 serves as a physical node constituting the physical layer. A VM (Virtual Machine) 7 disposed on the virtual layer as illustrated in FIG. 1 is a virtual node in which the server 3 or the edge 4 is virtualized.

The ICT resource management device 1 manages the physical node and the virtual node, each as an ICT resource.

The service provider terminal 2 is a terminal which requests to change a configuration in such as, for example, an initial deployment and a scale variability. The service provider terminal 2 makes such a request via an API (Application Programming Interface). The API is a northbound API between the ICT resource management device 1 and the service provider terminal 2. The service provider terminal 2 is utilized by a service provider or the like.

The server 3 is a computing machine which performs a process of providing a service. The server 3 illustrated in FIG. 1 is arranged on a cloud platform and performs a process for cloud service. The server 3 has therein one or more applications 6 for implementing a process of providing a service.

The edge 4 is a networking device installed on a NW (network); and includes, for example, a router, a bridge, a gateway, and a movable MDC (micro data center). The edge 4 has one or more applications 6 for implementing a process of providing a service arranged therein. The server 3 and the edge 4 are communicably connected to each other.

The device 5 is a device by which an end user uses a service; and includes, for example, IoT device. Upon connection to the server 3 or the edge 4, the device 5 can use a service.

The ICT resource management device 1 collects information on a physical node and a virtual node. The ICT resource management device 1 performs mapping between the physical layer and the virtual layer, using the collected information (see the dashed double-headed arrows in FIG. 1).

The ICT resource management device 1 performs orchestration of the virtual layer. More specifically, the ICT resource management device 1 makes deployment of a service and assignment of a resource to the VM 7.
<Details of ICT Resource Management Device 1>

Figure 2:
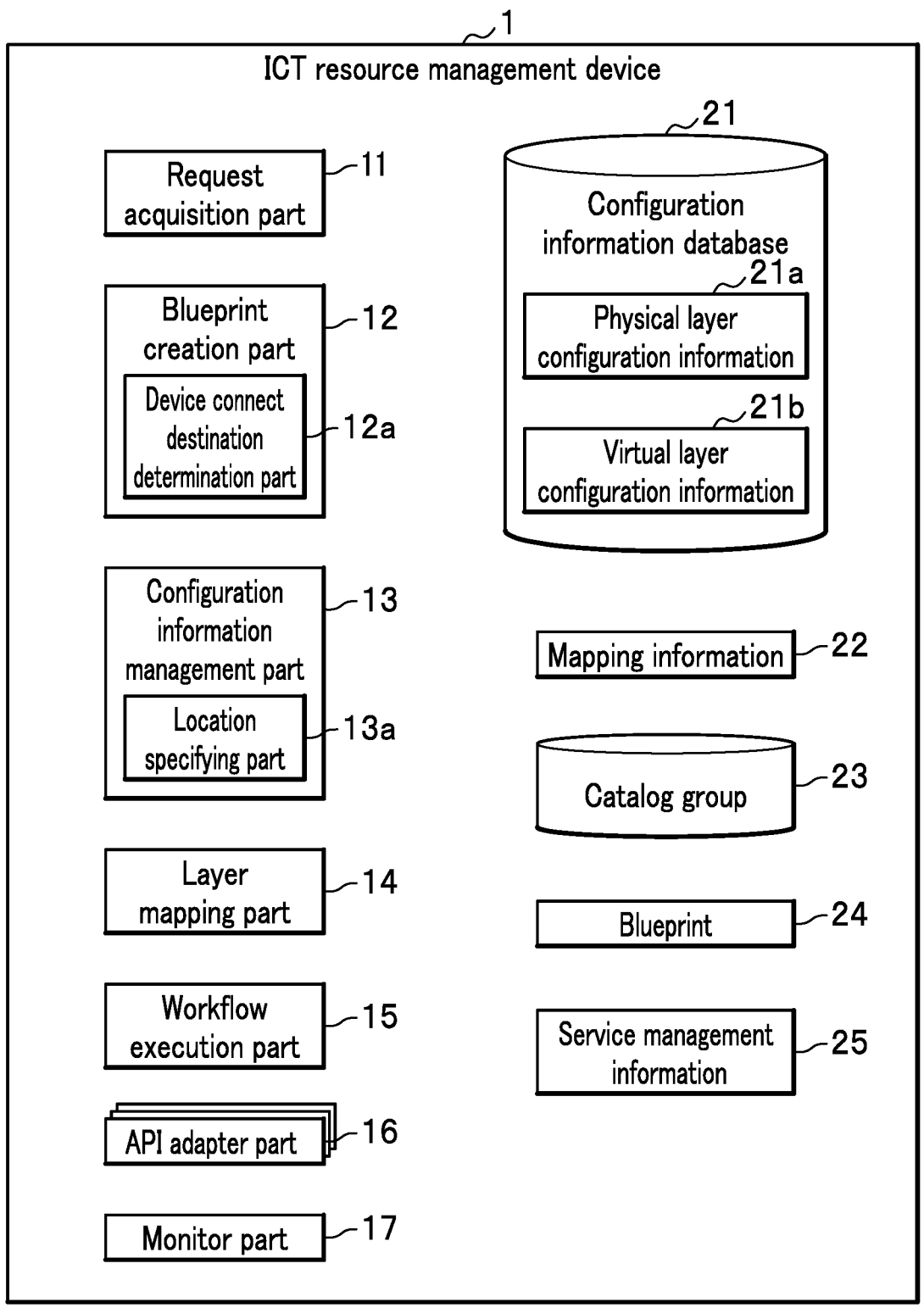
FIG. 2 is a functional configuration diagram illustrating an example of the ICT resource management device according to the embodiment.

As illustrated in FIG. 2, the ICT resource management device 1 includes function parts such as a request acquisition part 11, a blueprint creation part 12, a configuration information management part 13, a layer mapping part 14, a workflow execution part 15, an API adapter part 16, and a monitor part 17. The blueprint creation part 12 includes a device connect destination determination part 12*a*. The configuration information management part 13 includes a location specifying part 13*a*. The ICT resource management device 1 stores, in a storage thereof, a configuration information database 21, mapping information 22, a catalog group 23, a blueprint 24, and service management information 25. The storage included in the ICT resource management device 1 may be disposed, for example, inside of the ICT resource management device 1 or outside thereof.

[Request Acquisition Part 11]

The request acquisition part 11 acquires a request to change a configuration from the service provider terminal 2. Such a request acquired by the request acquisition part 11 may also be referred to as "order information". Not only the service provider terminal 2 but also, for example, a terminal of a person in charge of maintenance of the distributed system 100 can make a request for a configuration change. Each of the service provider terminal 2 and the terminal of the maintenance person as described above may also be referred to as an externally-provided device.

[Blueprint Creation Part 12]

The blueprint creation part 12 creates the blueprint 24 corresponding to the order information acquired by the request acquisition part 11. The blueprint 24 is design information on an infrastructure required for a requested change in configuration. The infrastructure represents a component of an operating environment of a service; and includes components of various types such as, for example, an ICT resource itself, set information on the ICT resource (for example, a VM name, an IP address, and a host name), an allocated resource thereof, a LB (load balancer), a FW (firewall), and a container set on a network.

[Device Connect Destination Determination Part 12*a*]

When order information acquired by the request acquisition part 11 is a request for a configuration change regarding the connection from the device utilizing the service to a physical node, the device connect destination determination part 12*a* included in the blueprint creation part 12 determines a physical node to be connected to each of the devices 5 that utilize the services in response to the order information. The connection destination may also be a virtual node running on the physical node.

Note that the device connect destination determination part 12*a* may be located anywhere in the ICT resource management device 1, and is provided, for an example, in the blueprint creation part 12 in this embodiment.

[Configuration Information Management Part 13]

The configuration information management part 13 manages information on an ICT resource as configuration information. The configuration information management part 13 collects information on a physical node and a virtual node, by, for example, accessing an API for collecting resource information. The API for collecting resource information utilized herein is an API for providing resource information which is prepared by a target for orchestration. The API for collecting resource information is a southbound API between the ICT resource management device 1 and a target for orchestration. Information collected includes, for example but not limited to, a MIB (Management Information Base) by the SNMP (Simple Network Management Protocol). The configuration information managed by the configuration information management part 13: is stored in the configuration information database 21; and is divided into physical layer configuration information 21*a* and virtual layer configuration information 21*b*.

The target for orchestration includes but not limited to a physical node and a virtual node. An interface provided by the target for orchestration may be provided by, for example, a controller (not illustrated) which controls the target for orchestration of interest or by each of a physical node and a virtual node.

The physical layer configuration information 21*a* is configuration information on a physical node on a physical layer. As illustrated in FIG. 3, the physical layer configuration information 21*a* includes management items such as "Node ID", "State", "Host Name", "IP Address", "VM ID", "Service Used", "User", "Location", "Network Connection", and "Quality" as a column header. Values of respective management items are stored therein for each of physical nodes.

The management item "Node ID" contains an identifier of a physical node of interest.

The "State" contains an operating state of the physical node ("OK" in normal operating state and "NG" in malfunction state).

The "Host Name" contains a host name of the physical node.

The "IP Address" contains an IP address assigned to the physical node.

The "VM ID" contains an identifier of a VM operating on the physical node.

The "Service Used" contains an identifier of a service which can be utilized at the physical node. The service includes, for example but not limited to a cloud service and an edge computing service. The service may include a service which is available at each of a plurality of physical nodes, as the same service.

The "User" contains an identifier of a user who uses the service utilized of interest. The user may be, for example, a business entity or an individual. In another example, when a physical node of interest is an edge device, a user corresponding thereto is limited to an owner of the edge device.

The "Location" contains information indicating a location of a corresponding physical node (e.g., latitude, longitude).

The "Network Connection" contains information indicating a connection type or topology of the network between the physical node and the device 5 that connects to the corresponding physical node.

The "Quality" contains information indicating the quality of the network between the physical node and the device 5 that connects to the corresponding physical node (e.g., network delay, latency) is stored.

The management items of the physical layer configuration information 21*a* illustrated in FIG. 3 are given as an example and any other management item may be added thereto. For example, a memory size of a VM operating on a physical node of interest, a CPU frequency, a power source state, and a name of the VM may be set as the management items of the physical layer configuration information 21*a*.

A name of a resource pool utilized for a physical node of interest and an ID thereof may be set as the management items.

A type of a network in which a physical node of interest is arranged, an ID of the network, and a name thereof may be set as the management items.

An ID of a folder utilized by a physical node of interest, a type thereof, and a name thereof may be set as the management items.

A storage capacity of a data store utilized by a physical node of interest, an ID of the data store, a type thereof, and a name thereof may be set as the management items.

An ID of a data center which controls a physical node of interest, and a name thereof may be set as the management items.

A name of a user who accesses a physical node of interest and a password thereof, each as authentication information on the user, may be set as the management items.

Referring back to FIG. 2, the virtual layer configuration information 21b is configuration information on a virtual node on the virtual layer. As illustrated in FIG. 4, the virtual layer configuration information 21b includes such management items as, for example, "Node ID", "State", "VM Name", "IP Address", and "Physical Device ID", each as a column header. Values of respective management items are stored therein for each of the virtual nodes.

The management item "Node ID" contains an identifier of a virtual node of interest.

The "State" contains an operating state of the virtual node ("OK" in normal operating state and "NG" in malfunction state).

The "VM Name" contains a name of the virtual node.

The "IP Address" contains an IP address assigned to the virtual node.

The "Physical Device ID" contains an identifier of a physical node on which the virtual node is arranged.

The management items of the virtual layer configuration information 21b illustrated in FIG. 4 are given as an example and any other management item may be added thereto. For example, a VM ID which is utilized as information on an ID of a virtual node of interest may be set as the management item of the virtual layer configuration information 21b.

A memory size of a VM as a resource of a physical node of interest, and a CPU frequency thereof may be set as the management items.

A power source state of a physical node of interest may be set as the management item.

A name of a user who accesses a virtual node of interest and a password thereof, each as authentication information on the user, may be set as the management items.

A gateway, a VXLAN (Virtual eXtensible Local Area Network), and a static route, each utilized by a physical node of interest may be set as the management items.

A host name of a physical node on which a virtual node of interest is arranged may be set as the management item.

Information on a hypervisor which creates a virtual node of interest may be set as the management item.

A management item of a container application may be set as the management item set in the virtual layer configuration information 21b. For example, a host name of a container host registered as a container utilized by a virtual node of interest, a label thereof, a state thereof, and an account ID thereof may be set as management items of the virtual layer configuration information 21b.

An ID of a service provided by a container utilized by a virtual node of interest, a name thereof, a state thereof, and a scale thereof (the number of units of servers utilized) may be set each as the management items.

A mount of a volume of a storage device provided by a container utilized by a virtual node of interest, an ID thereof (only when RancherNFS (Network File System) is utilized), and an image ID thereof may be set as the management items.

A group of stacks of a storage device provided by a container utilized by a virtual node of interest, a health state thereof, a stack ID thereof, and an ID of a service utilized thereof may be set as the management items.

[Location Specifying Part 13a]

Referring back to FIG. 2, the location specifying part 13a included in the configuration information management part 13 specifies the location of the physical node. The specified location of the physical node constitutes a part of the physical layer configuration information 21a. The location specifying part 13a is a part of the functions of the configuration information management part 13, and for example, is able to access an API to collect resource information and to associate sets of the collected information with each other to specify the location of the physical node. For example, when the edge 4 is a building accommodating a communication device, the location specifying part 13a is able to specify the location of the edge 4 by collecting a building code of the building and associating it with the location.

Note that the location specifying part 13a may be installed anywhere in the ICT resource management device 1, and in this embodiment is assumed to be provided, for example, in the configuration information management part 13.

[Layer Mapping Part 14]

The layer mapping part 14 performs mapping between the physical layer and the virtual layer. More specifically, the layer mapping part 14 determines to which physical node (or to which application 6 installed on the physical node) on the physical layer a virtual node on the virtual layer is associated, based on the configuration information managed by the configuration information management part 13. The ICT resource management device 1 stores a result of the association between the physical node and the virtual node determined by the layer mapping part 14, as the mapping information 22. For example, the layer mapping part 14 references the management item "VM ID" in the physical layer configuration information 21a (FIG. 3) and the management item "Physical Device ID" in the virtual layer configuration information 21b (FIG. 4), to thereby determine an association between a physical node and a virtual node.

The blueprint 24 is described in detail with reference to FIG. 5. FIG. 5 is a diagram for explaining the blueprint 24 at initial deployment. As illustrated in FIG. 5, the blueprint 24 is configured as a service template paired with a parameter. The service template may be composed of a group of catalogs. The catalog: is a template utilized in a process of providing a service; and is a component element of the catalog group 23 stored in the ICT resource management device 1. The catalog is well known, description of which is thus omitted herein. The parameter is input information to each of the catalogs.

The blueprint 24 illustrated in FIG. 5 is that at initial deployment. The order information acquired by the request acquisition part 11 is thus order information on the initial deployment. At the initial deployment, the blueprint creation part 12 selects, for example, a catalog for creating a VM, a catalog for setting a network, and a catalog for setting a container, from the catalog group 23, to thereby configure a service template.

The number and types of parameters inputted into the catalog for creating a VM are, for example, same as those of VMs to be created. In FIG. 5, five parameters are inputted into the catalog for creating a VM, which respectively correspond to three units of VMs each functioning as a Web server and two units of VMs each functioning as an AP server (an application server). An input of a parameter into the catalog for creating a VM may be performed by, for example, the service provider terminal 2.

A parameter inputted into the catalog for setting a network is, for example, assignment of an IP address (an IP assignment). In FIG. 5, a parameter specifying an IP address assigned to a created VM is inputted into the catalog for setting a network. The parameter inputted into the catalog for setting a network may be acquired from, for example, the distributed system 100.

A parameter inputted into the catalog for setting a container is, for example, a method of setting a container utilized by a created VM. In FIG. 5, a parameter representing a setting method of executing a copy by Rancher is inputted into the catalog for setting a container. An input of a parameter into the catalog for setting a container may be performed by, for example, the service provider terminal 2.

The blueprint creation part 12: selects a necessary catalog from the catalog group 23 in accordance with an operation indicated by the order information acquired by the request acquisition part 11; and thereby creates a service template. The blueprint creation part 12 can acquire the parameter inputted into the selected catalog from the order information or the distributed system 100. That is, the blueprint creation part 12: requests a parameter inputted into the selected catalog, from the service provider terminal 2 having transmitted the order information or the like; and receives the order information again as a response to the request, to thereby acquire the parameter from the order information. When the distributed system 100 itself can acquire a parameter at a time of, for example, IP address dispensing, the blueprint creation part 12 acquires a parameter inputted into the selected catalog from the distributed system 100.

In creating the blueprint 24, the blueprint creation part 12 references the configuration information managed by the configuration information management part 13 and the mapping information 22 stored in the layer mapping part 14. That is, the blueprint creation part 12 compares: respective current states of a physical node and a virtual node of interest determined from the physical layer configuration information 21*a*, the virtual layer configuration information 21*b*, and the mapping information 22; with a request of a service provider or the like indicated by the order information, based on which the blueprint 24 is created.

[Workflow Execution Part 15]

The workflow execution part 15 executes a workflow in accordance with the blueprint 24 created by the blueprint creation part 12. The workflow is a sequence of processes which are indicated by a catalog in the blueprint 24 and are combined in a systematic order. In the blueprint 24 at the initial deployment illustrated in FIG. 5, a workflow at the initial deployment is a sequence of such processes as "Create a VM→Set a network→Set a container" in this order. Upon execution of a workflow by the workflow execution part 15, an orchestration is performed and a resource is assigned to an ICT resource.

[API Adapter Part 16]

The API adapter part 16 is an interface to access a program which can be operated via an API, in response to an instruction from the workflow execution part 15 which executes the workflow. Such an API is a southbound API between the API adapter part 16 (or the ICT resource management device 1 including the API adapter part 16) and a target for orchestration. The API adapter part 16 is interface-connectable to each of targets for orchestration. A plurality of the API adapter parts 16 can be provided for each program which is operable via the API. Execution of a program operable via an API by the workflow execution part 15 makes it possible to perform a workflow.

A combination of the workflow execution part 15 and the API adapter part 16 works as an orchestrator part which performs orchestration.

[Monitor Part 17]

The monitor part 17 monitors a physical node on the physical layer and a virtual node on the virtual layer by, for example, SNMP. A monitored result obtained by the monitor part 17 shows how a service is utilized, to which an orchestration has been performed, to thereby become available. The monitored result obtained by the monitor part 17 is transmitted to the configuration information management part 13. The configuration information management part 13 collects information on a physical node and a virtual node from the monitored result obtained by the monitor part 17.

[Service Management Information 25]

The service management information 25 is management information of services such as network services, cloud services, and the like utilized by the distributed system 100. As shown in FIG. 6, the service management information 25 includes management items such as "Service ID", "Used application", "Operating ICT resource", and "SLA", and contains a value of each management item for each service.

The management item of the "Service ID" contains an identifier of the target service.

The "Used application" contains an identifier of the application 6 used to provide the corresponding service. In other words, the utilized application is an application that configures content of the corresponding service.

The management item of "Operating ICT resource" contains an identifier of the ICT resource that operates when the target service is provided. In other words, the operating ICT resource is a physical node on which the application utilized is assigned, or a virtual node that operates on the physical node. Further, the operating ICT resource is an ICT resource which is a target of resource assignment when receiving a new subscription from a service provider.

The management item of "SLA" contains set information of the SLA set to the corresponding service. The set information of the SLA includes, for example, information indicating an agreement of keeping service quality regarding a communication-start delay time, a network delay time, a network operating rate, a line operating rate, a failure recovery time, a failure notification time, and a bandwidth guarantee.

The device connect destination determination part 12*a*, in response to order information that is a request for a configuration change regarding a connection of the device 5 utilizing a service to a physical node, is able to determine a physical node to be a connection destination of the device 5 utilizing the service based on at least one of the location of the physical node specified by the location identification part 13*a*, information on the service, the network connection configuration of the network connecting the device 5 to the physical node (see FIG. 3), and the quality of the network (see FIG. 3), and the like. Note that the request for configuration change regarding the connection of the device 5 utilizing the service to the physical node may include a request regarding assignment of a virtual node required for information processing for the device 5 on the physical node to be the connection destination and assignment of the application 6 on the virtual node assigned.

In addition, the above-mentioned "information on the service" includes, but is not limited to, content of the service, quality of the service, delay requirement, the SLA, and the like. The above-mentioned "information on the service" corresponds to information managed in the service management information 25.

When determining the connection destination based on the location of the physical node specified by the location specifying part 13*a*, the physical node having a short relative distance (within a predetermined distance) to the device 5 utilizing the service may be determined as an optimum physical node. When the device 5 is a moving body, a physical node having a short relative distance to the device 5 after the device 5 stops moving may be determined as the optimum physical node. Such a determination is effective under a condition that the number of network hops decreases as a relative distance between an application arranged on the device 5 and an application arranged on the physical node becomes short. For example, when the device 5 as a mobile body whose connection destination is a server located in Osaka moves from Osaka to Tokyo, a server located in Tokyo may be utilized as a new connection destination, and thereby the relative distance between the application arranged on the server located in Tokyo and the application arranged on the device 5 becomes close and the determination of the physical node is optimized.

When the device connect destination determination part 12*a* determines the connection destination based on at least one of the network connection configuration of the network connecting the device 5 and the physical node and the quality of the network, a physical node that has established a means of communication with the device 5 utilizing the service (a communication infrastructure between the device 5 and the physical node has been established) and is able to secure sufficient free resources for the device 5 is determined as an optimum physical node. A physical node that is able to secure the sufficient free resources but has no communication means is excluded from connection destination candidates.

The blueprint creation part 12 may create a blueprint 24 based on the connection destination determined by the device connect destination determination part 12*a* as well as the physical layer configuration information 21*a*, the virtual layer configuration information 21*b*, and the mapping information 22 as described above in response to the request for the configuration change regarding the connection of the device 5 utilizing the service to the physical node.

The workflow execution part 15 executes a workflow according to the blueprint 24 created by the blueprint creation part 12. This causes the orchestration to be performed and resources to be assigned as the ICT resource.

When the device connect destination determination part 12*a* determines the connection destination of the device 5, the connection destination can be determined based on not only the location information of the physical node to be connected, but also, for example, a parameter such as a logical distance (metric), a processing capacity, a processing speed, and a reliability of the physical node. The management items on the physical layer contains not only "location", but also management items such as "logical distance", "processing capacity", "processing speed", and "reliability". Further, the parameter for determining the connection destination may be a combination of a plurality of types of parameter.

There are various ways for determining the connection destination of the device 5. For example, if the resources in Tokyo and the resources in Osaka have the same metric for Shizuoka, using only the metric does not allow determining whether the physical node in Tokyo or the physical node in Osaka should be the connection destination. In such a case, using an additional parameter indicating "Kanto" allows determining the physical node in Tokyo as the connection destination. As described above, a plurality of parameters may be used.

In addition, the connection destination may be determined by designating specific location information as a requirement. For example, the requirement may be designated as a condition such as "around the Olympic venue" or "avoiding disaster areas (to avoid congestion)", and thereby a physical node or a group of physical nodes that meet the requirement may be determined as the connection destination. Further, when the physical node to which the device 5 is connected is in a failure state, another physical node existing at a location where the device 5 can communicate with it may be determined as a new connection destination.

Additionally, an applied technique from a technique for determining the connection destination of the device 5 can be introduced. For example, a technique of analyzing movement history of a physical node may be applied for making a deployment plan of equipment accommodating the physical node (e.g., MDC).

<<Processing>>

Processing performed by the ICT resource management device 1 according to this embodiment is described with reference to FIG. 7. The processing is started when, for example, the device utilizing a service makes a request for an operation such as a configuration change regarding a connection to a physical node.

First, the request acquisition part 11 outputs order information showing an operation such as a configuration change, to the blueprint creation part 12 (step S1). The blueprint creation part 12 requests configuration information of interest, from the configuration information management part 13 (step S2). The configuration information management part 13 outputs the configuration information stored in the configuration information database 21, more specifically, the physical layer configuration information 21*a* and the virtual layer configuration information 21*b*, to the blueprint creation part 12 (step S3). The outputted configuration information includes the location specified by the location specifying part 13*a*, that is, the location information indicating the location of each of the physical nodes included in the distributed system 100.

The blueprint creation part 12 requests the mapping information 22 from the layer mapping part 14 (step S4). The layer mapping part 14 outputs the mapping information 22 to the blueprint creation part 12 (step S5).

Next, the device connect destination determination part 12*a* of the blueprint creation part 12 determines a connection destination of each device 5 in response to the order information (Step S6*a*), based on at least any one of the location information (see FIG. 3) of each physical node included in the configuration information inputted by the configuration information management part 13, the information on the service, the network connection configuration of the network connecting the devices 5 to the physical nodes (see FIG. 3), and the quality of the network (see FIG. 3). The physical node to be connected is a physical node that is able to satisfy the SLA of each service provided by the distributed system 100. If a load of a specific physical node exceeds a threshold value, the device connect destination determination part 12*a* changes the connection destination so that the device 5 connected to the specific physical node is to be connected to another physical node, and thereby the load distribution is able to be performed.

Next, the blueprint creation part 12 creates the blueprint 24 in response to the order information, based on the configuration information, the mapping information, and the connection destination determined by the device connect destination determination part 12*a* (step S6). At this time, the blueprint creation part 12: selects a catalog required for the operation, from the catalog group 23 depending on the order information; and acquires a parameter inputted into the selected catalog from the order information or the distributed system 100.

Next, the blueprint creation part 12: transmits the created blueprint 24 to the service provider terminal 2 or the like which has transmitted the order information, via the request acquisition part 11; and requests therefrom an acknowledgment of the blueprint 24 (step S7). If a positive acknowledgement of the blueprint 24 is received therefrom, the request acquisition part 11 transmits information showing the positive acknowledgement from the service provider terminal 2 or the like, to the blueprint creation part 12 (step S8).

Of the entire processing performed by the ICT resource management device 1, step S1 to step S8 constitute infrastructure designing.

In order to expedite the processing, step S7 and step S8 may be omitted.

Next, the blueprint creation part 12 creates a script for performing an orchestration based on the acknowledged blueprint 24 (step S9). A technique of creating a script is well known, description of which is thus omitted herein. The blueprint creation part 12 then outputs the created script to the workflow execution part 15 (step S10).

Of the entire processing performed by the ICT resource management device 1, step S9 and step S10 perform creation of a script.

Next, the workflow execution part 15 interprets the script acquired from the blueprint creation part 12 (step S11). A technique of interpreting a script is well known, description of which is thus omitted herein. The workflow execution part 15 gives an appropriate instruction to the API adapter part 16 for each of programs, each of which can be operated via an API (step S12), to thereby execute an appropriate process.

When execution of the process has been successfully completed, the API adapter part 16 notifies the workflow execution part 15 of the completion of the process execution (step S13). The workflow execution part 15 notifies the blueprint creation part 12 of the completion of the process execution (step S14). The completion of the process execution means that an orchestration from the ICT resource management device 1 to the virtual layer has been completed and that a service after the configuration change becomes available.

Of the entire processing performed by the ICT resource management device 1, step S11 to step S14 perform orchestration.

The monitor part 17 then starts monitoring a physical node on the physical layer and a virtual node on the virtual layer. The monitor part 17 notifies the configuration information management part 13 of information collected by the monitoring (step S15). The configuration information management part 13 notifies the layer mapping part 14 of the information collected from the monitor part 17 (step S16).

Of the entire processing performed by the ICT resource management device 1, step S15 to step S16 perform monitoring.

The configuration information management part 13: creates configuration information based on the information collected by the monitor part 17; and stores the created configuration information in the configuration information database 21. At this time, the location specifying part 13a specifies the location of each physical node, and updates the value of the management item of "location" in the physical layer configuration information 21a (FIG. 3) of the configuration information. Further, the configuration information management part 13 updates the value of the management item of the "network connection" of the physical layer configuration information 21a (FIG. 3) based on the information collected by the monitor part 17. Furthermore, the configuration information management part 13 updates the value of the "quality" management item of the physical layer configuration information 21a (FIG. 3) based on the information collected by the monitor part 17. The layer mapping part 14 creates the mapping information 22 based on the information collect by the monitor part 17 via the configuration information management part 13. The created configuration information and the mapping information 22 is used for creating a new blueprint.

Figure 7:
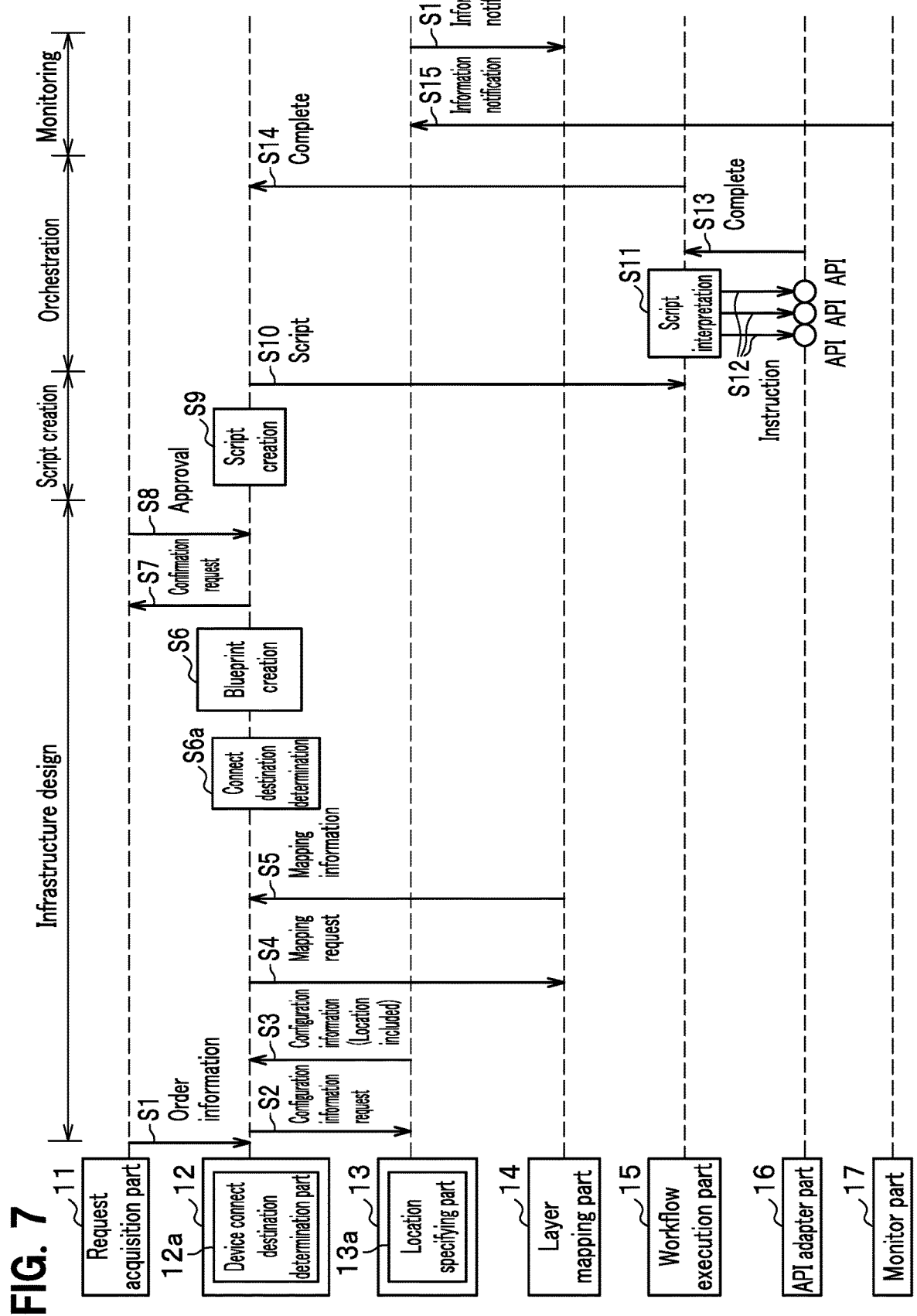
FIG. 7 is a sequence diagram illustrating an example of a processing performed according to the embodiment.

In the processing illustrated in FIG. 7, the ICT resource management device 1 is able to keep the configuration information and the mapping information 22 up-to-date. This makes it possible to create an appropriate blueprint without manual intervention and perform orchestration, thus allowing an automated operation to be achieved.

Further, the location information is able to be kept up-to-date, and therefore the connection destination of the device 5 is able to be determined so that the SLA of each service is satisfied.

<<Specific Example of Determining Connection Destination of Device>>

Figure 8:
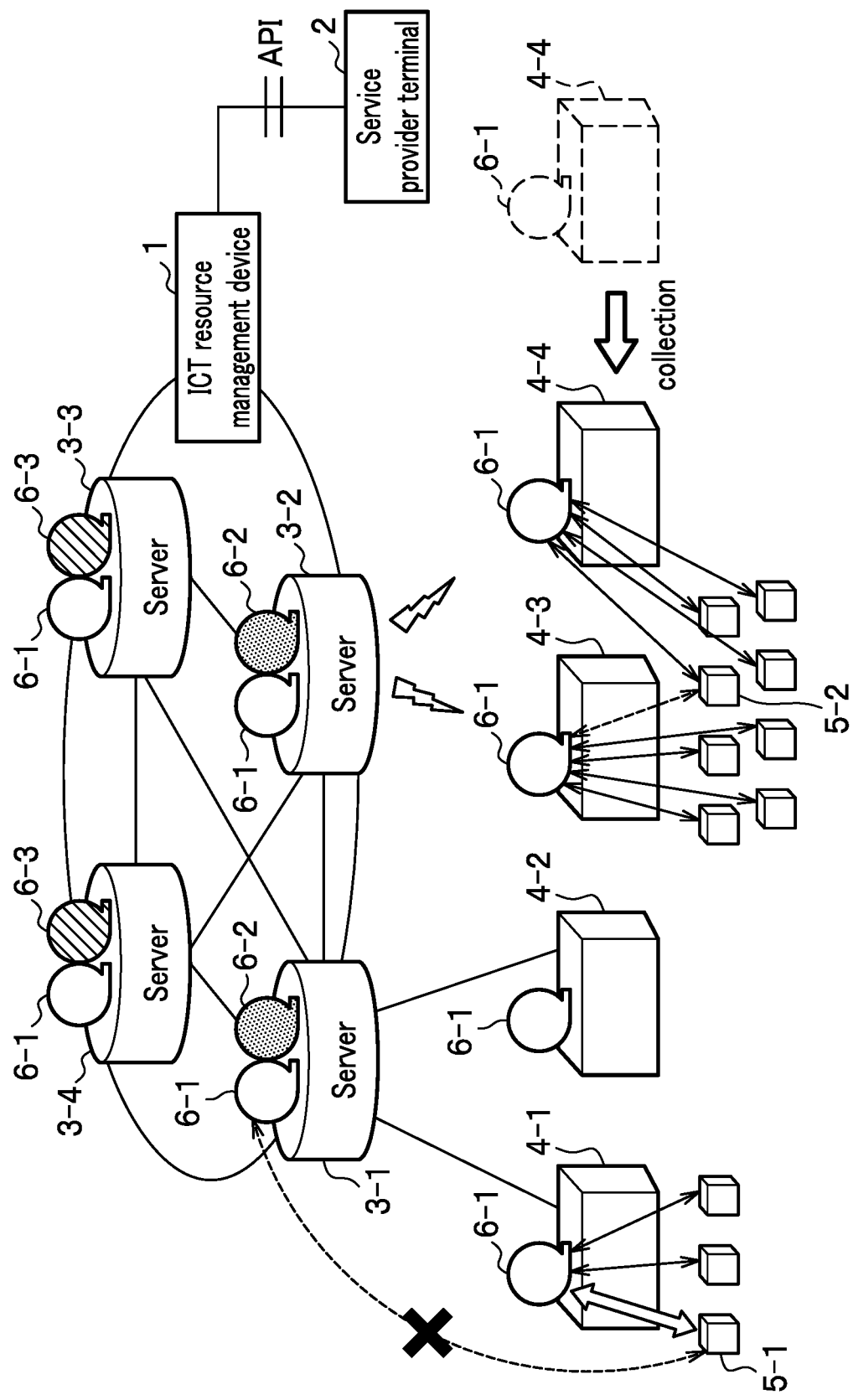
FIG. 8 is a specific example of determining a connection destination of a device.

Next, a specific example of determining the connection destination of the device is described in detail with reference to FIG. 8. For example, as shown in FIG. 8, it is assumed that there occurs a request for a configuration change to arrange another type of application 6-2 in a system in which an application 6-1 is arranged. There may be multiple candidates picked up for the connection destination in consideration of the server load and the resource availability. However, let assume that the application 6-2 is arranged on servers 3-1 or 3-2 but that the distance between the device 5-1 and the application 6-2 becomes too long for the delay requirement to be satisfied.

In the above case, the edge 4-1 is selected in order to satisfy the delay requirement depending on the distance from the device 5-1, and the application 6-2 is arranged thereto. That is, the device connect destination determination part 12a determines the edge 4-1 as the connection destination of the device 5-1.

The load on the server 3-1 is reduced because the device 5-1 is no longer connected to the server 3-1. When the SLA of the service configured by the application 6-1 is satisfied, the device connect destination determination part 12a determines the edge 4-1 as the connection destination of the device 5-1. The ICT resource management device 1 changes the connection destination of the device 5-1, and thereafter executes the orchestration by the workflow execution part 15 and the API adapter part 16.

Further, for example, let assume the number of devices increases, which devices including a device 5-2 are connected to the edge 4-3 and utilize a service configured by the application 6-1 arranged on the edge 4-3, as shown in FIG. 8. In this case, the load on the edge 4-3 increases due to the increasing traffic of communications with the devices. As a result, the service utilized by the device 5-2 connected to the edge 4-3, that is, the service configured by the application 6-1 is not able to be satisfied in the SLA.

Then, the device connect destination determination part 12a determines other connection destinations of several devices including the device 5-2. Specifically, as shown in FIG. 8, the edge 4-4 such as the MDC moves to a location where the device 5-2 is able to connect therewith, and the device connect destination determination part 12a determines the physical node (or a virtual node running on the physical node) that is the edge 4-4 as the other connection destination of the device 5-2. The edge 4-4 has the application 6-1 arranged thereon. It is also assumed that conditions of the network connection configuration and the quality of the network are satisfied between the device 5-2 and the edge 4-4.

As a result, several devices including the device 5-2 are disconnected from the edge 4-3, which causes the load on the edge 4-3 to be reduced. When the SLA of the service configured by the application 6-1 is satisfied, the device connect destination determination part 12a finally determines the edge 4-4 as the connection destination of the device 5-2. The ICT resource management device 1 changes the connection destination of the device 5-2, and thereafter executes the orchestration by the workflow execution part 15 and the API adapter part 16.

According to this embodiment, the optimum connection destination of the device 5 is able to be determined so as to satisfy the SLA of the service.

Therefore, the degradation of the quality of service for the operation is able to be prevented by considering at least one of the location of the physical nodes of the distributed system 100, the SLA, the network connection configuration of the network connecting the devices and the physical nodes, and the quality of the network.

Further, because the connection destinations of the device 5 include the movable physical node, and thereby the load distribution on the system 100 is able to be easily achieved by moving the movable physical node to the vicinity of the device 5 that causes an increase in the load of a specific physical node and connecting the movable physical node to the device 5.

<Program>

A program can be created in which a processing performed by the ICT resource management device 1 according to this embodiment is described in a computer-executable language. In this case, when the computer executes the program, advantageous effects same as those in the embodiment can be obtained. Additionally, the program can be stored in a computer-readable storage medium. A computer loads and executes the program stored in the storage medium, to thereby perform a processing same as that in the embodiment. Next is described an example in which a computer runs an ICT resource management program which achieves a function same as that of the ICT resource management device 1.

FIG. 8 is a diagram illustrating a computer which runs an ICT resource management program. As illustrated in FIG. 8, a computer 1000 includes, for example, a memory 1010, a CPU 1020, a hard disk drive interface 1030, a disk drive interface 1040, a serial port interface 1050, a video adapter 1060, and a network interface 1070, which are connected to each other by a bus 1080.

The memory 1010 includes a ROM (Read Only Memory) 1011 and a RAM (Random Access Memory) 1012. The ROM 1011 stores therein a boot program such as, for example, BIOS (Basic Input Output System). The hard disk drive interface 1030 is connected to a hard disk drive 1090. The disk drive interface 1040 is connected to a disk drive 1100. The disk drive 1100 has a removable storage medium inserted therein, for example, a magnetic disk and an optical disc. The serial port interface 1050 is connected to, for example, a mouse 1110 and a keyboard 1120. The video adapter 1060 is connected to, for example, a display 1130. A storage medium inserted into, for example, the memory 1010, the hard disk drive 1090, the disk drive 1100, and the disk drive 1100 is a specific hardware resource as a storage included in the ICT resource management device 1.

Figure 9:
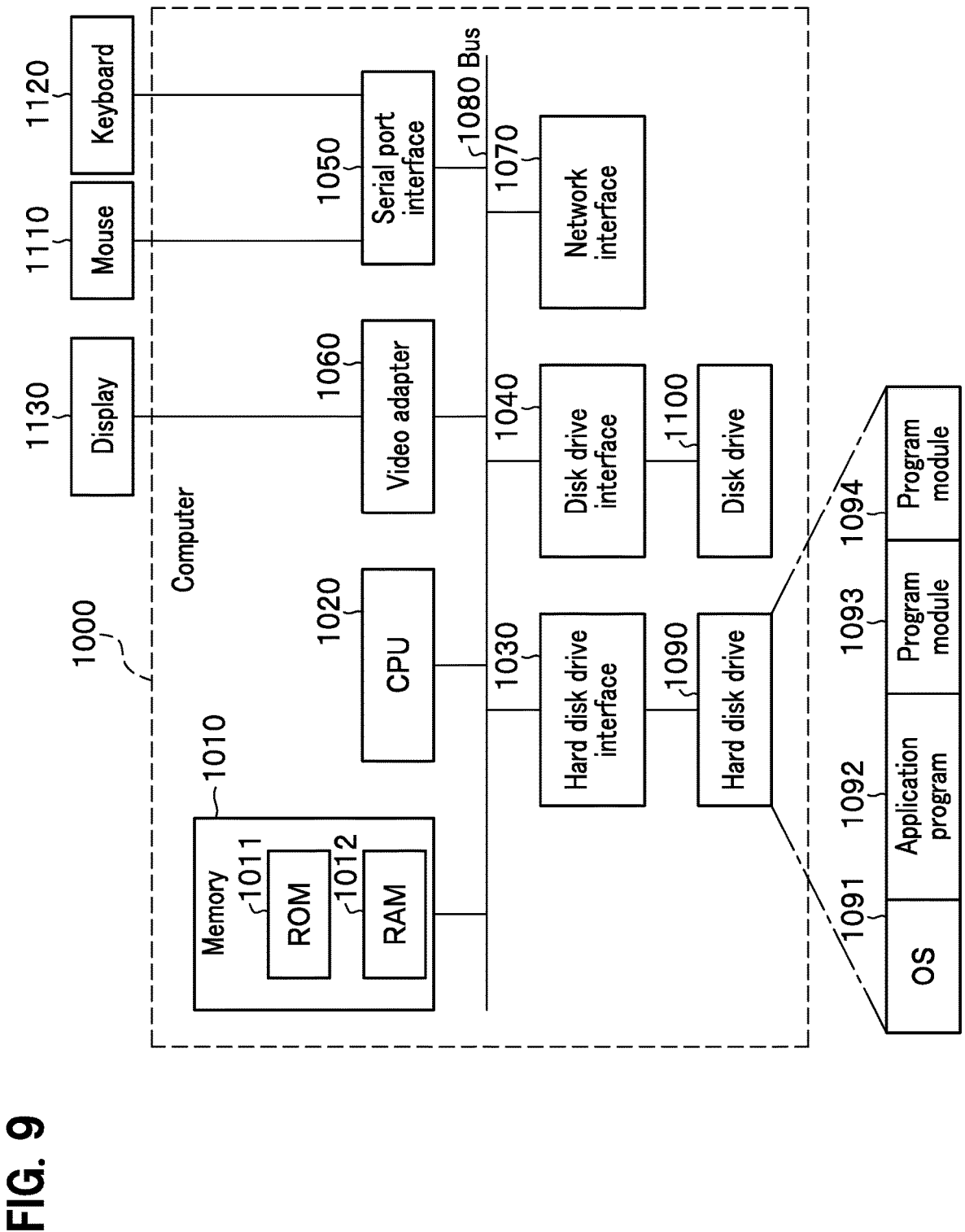
FIG. 9 is a diagram for explaining a computer executing a program of a processing performed according to the embodiment.

As illustrated in FIG. 9, the hard disk drive 1090 stores therein, for example, an OS 1091, an application program 1092, a program module 1093, and a program data 1094. The tables explained in the above-described embodiment are stored in, for example, the hard disk drive 1090 or the memory 1010.

The ICT resource management program is stored in the hard disk drive 1090 as, for example, a program module in which an instruction executed by the computer 1000 is described. More specifically, a program module in which each processing performed by the ICT resource management device 1 explained in the embodiment is stored in the hard disk drive 1090.

Data used in information processing by the ICT resource management program is stored in, for example, the hard disk drive 1090, as program data. The CPU 1020 reads a program module 1093 or a program data 1094 stored in the hard disk drive 1090, into the RAM 1012 according to the necessity; and thereby performs the above-described steps.

The program module 1093 or the program data 1094 of the ICT resource management program is stored in the hard disk drive 1090. The present invention is not, however, limited thereto. The program module 1093 or the program data 1094 may be stored in, for example, a removable storage medium; and may be read out by the CPU 1020 via the disk drive 1100 or the like. Alternatively, the program module 1093 or the program data 1094 may be stored in another computer connected via a LAN (Local Area Network), a WAN (Wide Area Network), or the like; and may be read out by the CPU 1020 via the network interface 1070.

<Others>

The configuration information management part 13 can manage information on a user who uses the device 5 connected to the edge 4 as a physical node or information on a tenant of the user. The configuration information managed as the physical layer configuration information 21a can be used as configuration information by the user or by the tenant. When the layer mapping part 14 performs mapping between the physical layer and the virtual layer, the configuration information by the user or by the tenant can be used as configuration information managed as the virtual layer configuration information 21b.

The blueprint 24 created by the blueprint creation part 12 of this embodiment is the blueprint that reflects the connection destination determined by the device connect destination determination part 12a. However, the ICT resource management device 1 of this embodiment may create a blueprint before the connection destination is determined by the device connect destination determination part 12a, and thereafter the device connect destination determination part 12a may perform a step of determining the connection destination.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

REFERENCE SIGNS LIST

100: distributed system
1: ICT resource management device
2: service provider terminal 3: server
4: edge
5: device
6: application
7: VM
11: request acquisition part
12: blueprint creation part
12a: device connect destination determination part
13: configuration information management part
13a: location specifying part
14: layer mapping part
15: workflow execution part (orchestrator part)
16: API adapter part (orchestrator part)
17: monitor part
21: configuration information database
21a: physical layer configuration information
21b: virtual layer configuration information
22: mapping information
23: catalog group
24: blueprint
25: service management information

The invention claimed is:

1. An information and communication technology (ICT) resource management device that manages a physical node and a virtual node as ICT resources, the ICT resource management device comprising:
  a configuration information management circuit configured to manage physical layer configuration information that is information on a configuration of the physical node on a physical layer and virtual layer configuration information that is information on a configuration of the virtual node on a virtual layer;
  a layer mapping circuit configured to perform mapping between the physical layer and the virtual layer;
  a location specifying circuit configured to specify a location of the physical node included in the physical layer configuration information;
  a first device connect destination determination circuit configured to determine a first physical node that is to be a connection destination to which a device utilizing a service is to be connected, based on at least any one of the specified location, service management information that is managed as information on the service, a network connection configuration of a network connecting the device utilizing the service to the first physical node determined to be the connection destination, and quality of the network in response to a request for configuration change regarding a connection of the device utilizing the service to the first physical node determined to be the connection destination;
  a blueprint creation circuit configured to create a blueprint in response to the request for the configuration change, which blueprint is design information on an infrastructure required for the configuration change, based on the physical layer configuration information, the virtual layer configuration information, mapping information that is information obtained as a result of the mapping, and the connection destination; and
  an orchestrator circuit configured to access and run a program that is operable via a southbound application programming interface (API), based on the blueprint, to thereby perform orchestration to the virtual layer, wherein the service management information includes information about an application utilized and about an operating ICT resource containing an identifier of the ICT resource that operates when a target service is provided.

2. The ICT resource management device according to claim 1, wherein the connection destination includes a movable physical node.

3. The ICT resource management device according to claim 1, comprising a second device connect destination determination circuit in place of the first device connect destination determination circuit, the second device connect destination determination circuit determining a second physical node that is to be a second connection destination to which a second device utilizing a second service is to be connected, based on at least any one of the specified location, a relative distance of the second physical node determined to be the second connection destination to the second device utilizing the second service, information on the second service that is managed as service management information, a network connection configuration of the network connecting the second device utilizing the second service to the second physical node determined to be the second connection destination, and quality of the network in response to a request for configuration change regarding a connection of the second device utilizing the second service to the second physical node determined to be the second connection destination.

4. The ICT resource management device according to claim 3, wherein the second connection destination includes a movable physical node.

5. An information and communication technology (ICT) resource management method in an ICT resource management device that manages a physical node and a virtual node as ICT resources, the ICT resource management method implemented by the ICT resource management device and comprising:
  managing physical layer configuration information that is information on a configuration of the physical node on a physical layer and virtual layer configuration information that is information on a configuration of the virtual node on a virtual layer;
  performing mapping between the physical layer and the virtual layer;
  specifying a location of the physical node included in the physical layer configuration information;
  determining a first physical node that is to be a connection destination to which a device utilizing a service is to be connected, based on at least any one of the specified location, service management information that is managed as information on the service, a network connection configuration of a network connecting the device utilizing the service to the first physical node determined to be the connection destination, and quality of the network in response to a request for configuration change regarding a connection of the device utilizing the service to the first physical node determined to be the connection destination;
  creating a blueprint in response to the request for the configuration change, which blueprint is design information on an infrastructure required for the configuration change, based on the physical layer configuration information, the virtual layer configuration information, mapping information that is information obtained as a result of the mapping, and the connection destination; and performing orchestration of the virtual layer based on the blueprint by accessing and running a program that is operable via a southbound application programming interface (API), wherein the service management information includes information about an application utilized and about an operating ICT resource containing an identifier of the ICT resource that operates when a target service is provided.

6. The ICT resource management method according to claim 3, wherein the connection destination includes a movable physical node.

7. One or more non-transitory computer-readable media comprising instructions stored thereon that are executable by one or more processing devices and upon such execution cause the one or more processing devices to perform operations comprising:

managing physical layer configuration information that is information on a configuration of a physical node on a physical layer and virtual layer configuration information that is information on a configuration of a virtual node on a virtual layer;

performing mapping between the physical layer and the virtual layer;

specifying a location of the physical node included in the physical layer configuration information;

determining a first physical node that is to be a connection destination to which a device utilizing a service is to be connected, based on at least any one of the specified location, service management information that is managed as information on the service, a network connection configuration of a network connecting the device utilizing the service to the first physical node determined to be the connection destination, and quality of the network in response to a request for configuration change regarding a connection of the device utilizing the service to the first physical node determined to be the connection destination;

creating a blueprint in response to the request for the configuration change, which blueprint includes design information on an infrastructure required for the configuration change, based on the physical layer configuration information, the virtual layer configuration information, mapping information that is information obtained as a result of the mapping, and the connection destination; and performing orchestration of the virtual layer based on the blueprint by accessing and running a program that is operable via a southbound application programming interface (API), wherein the service management information includes information about an application utilized and about an operating ICT resource containing an identifier of the ICT resource that operates when a target service is provided.

8. The one or more non-transitory computer-readable media according to claim 5, wherein the connection destination includes a movable physical node.

9. The one or more non-transitory computer-readable media according to claim 7, comprising instructions that cause the one or more processing devices to perform operation of determining a second physical node that is to be a second connection destination to which a second device utilizing a second service is to be connected, based on at least any one of the specified location, service management information that is managed as information on the second service, a network connection configuration of the network connecting the second device utilizing the second service to the second physical node determined to be the second connection destination, and quality of the network in response to a request for configuration change regarding a connection of the second device utilizing the second service to the second physical node determined to be the second connection destination.

* * * * *